March 28, 1961     E. W. SCOTT     2,977,025
WATER DISPENSER
Filed Aug. 8, 1957
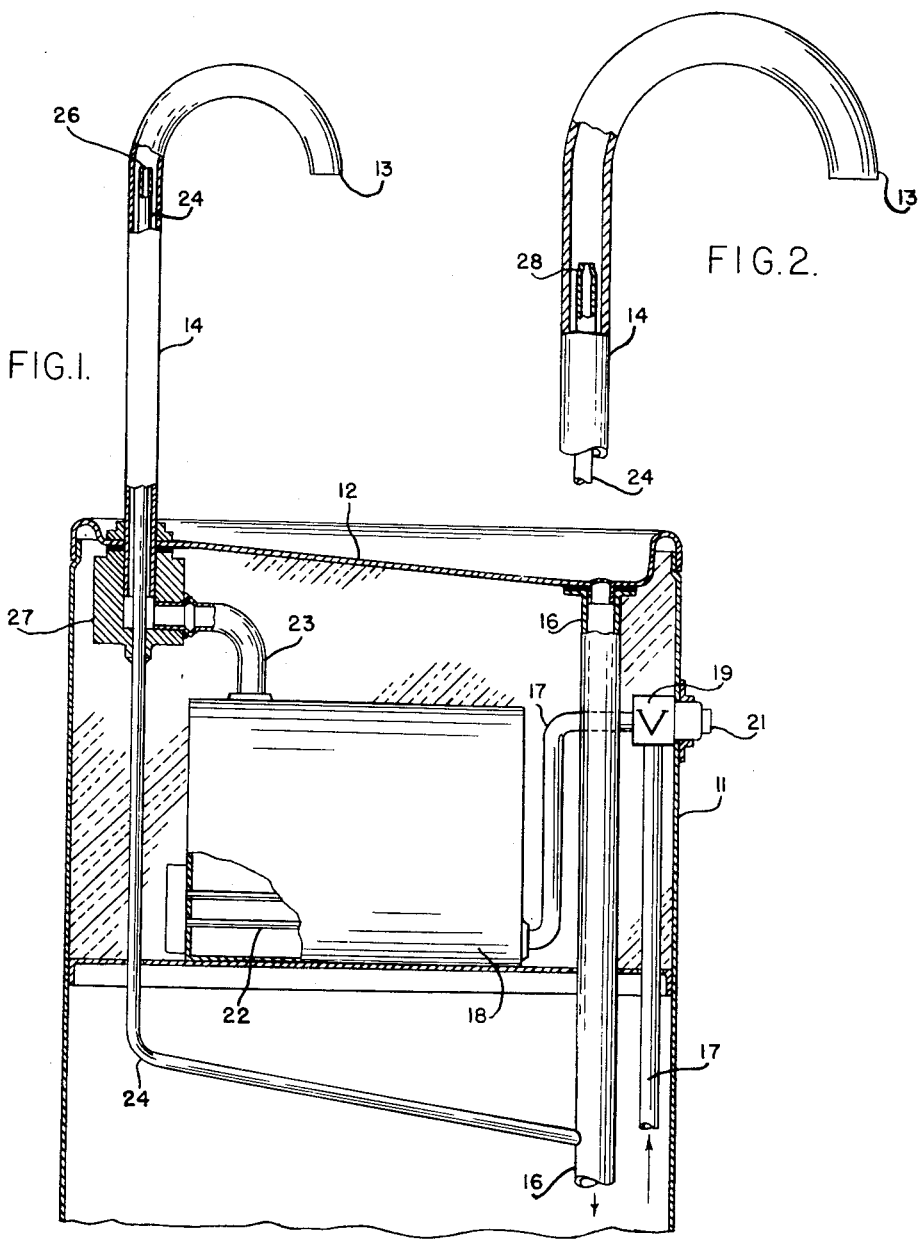
INVENTOR
EUGENE W. SCOTT
BY *William J. Foley*
ATTORNEY

United States Patent Office 2,977,025
Patented Mar. 28, 1961

2,977,025
WATER DISPENSER

Eugene W. Scott, Upper Arlington, Franklin County, Ohio, assignor to Westinghouse Electric Corporation, East Pittsburgh, Pa., a corporation of Pennsylvania Filed Aug. 8, 1957, Ser. No. 677,023

2 Claims. (Cl. 222—108)

This invention relates to liquid dispensing apparatus and more particularly to apparatus for dispensing hot water for use in mixing beverages or the like.

With the comparatively recent advent of powdered beverages, such as tea and coffee, and other food stuffs, such as soups, capable of being prepared by mixing a powdered concentrate with hot water, there is need for a compact arrangement for dispensing water at a temperature of from 160° F. up to the boiling point of water. It is an object of this invention to provide an improved water heating and dispensing system and apparatus for this purpose.

This invention is particularly applicable to a system wherein water is heated in a non-pressurized vessel or tank and the heated water is discharged from the tank when displaced by incoming water from a pressurized source under the control of a shut-off valve. In such a system constructed in accordance with this invention, the water discharged, or displaced, from the heating tank is conveyed to a discharge nozzle, located conveniently to the user of the water, by means of a discharge conduit that is substantially unrestricted and establishes open communication between the interior of the water heating tank and the atmosphere. This discharge conduit has an overflow drain pipe or tube located within its bore and the pipe is in open communication with an elevated region of the discharge conduit for the purpose of receiving, and carrying away to a drain, water that is forced toward the discharge nozzle by the expansion of water in the heating tank. The overflow pipe discharges to drain that water which might otherwise drip from the dispensing nozzle between periods when water is actually being drawn from the system, and eliminates the possible hazard of scalding a person's hand by accidental contact with the hot dripping water.

The overflow arrangement of this invention is also useful in preventing the annoying or hazardous dripping of hot water from the dispensing nozzle that would be occasioned by a slow leak in the shut off valve controlling the flow of water into the water heating tank.

Other advantages, features and objects of the invention will appear from the following detailed description thereof, of which the accompanying drawings form a part and wherein:

Fig. 1 is a fragmentary view, partially in section, illustrating a hot water dispenser embodying this invention; and Fig. 2 is an enlarged fragmentary view, partially in section, illustrating a modified arrangement of the overflow tube employed in the dispenser.

Referring particularly to Fig. 1, the water heating and dispensing system is incorporated in a free standing decorative cabinet or casing 11 similar in appearance to cabinets of the type employed to house water coolers. The top wall of the cabinet 11 has a depressed region formed therein that constitutes a catch basin 12 disposed beneath a U-shaped nozzle, or outlet end, 13 of a hot water discharge conduit 14 that extends upwardly through the top of the cabinet 11. The discharge nozzle 13 is adapted to discharge water downwardly and is disposed above the basin 12 a distance sufficient to permit a cup or other receptacle to be placed beneath the nozzle for receiving hot water. Water discharged from the nozzle 13 in the absence of a receiving vessel falls onto the catch basin 12 and is directed by the basin into a drain 16.

Unheated water is admitted to the dispenser from a pressurized source (not shown) by a supply conduit 17 that discharges into a water heating tank 18. The flow of water into the tank 18 is controlled by a shut-off valve 19 disposed in the supply conduit 17 and having a push button 21, or other suitable manually actuable control means, disposed on the outside of the dispenser cabinet 11 in a position that is accessible to the user of the dispenser. If desired, an electrically controlled solenoid valve can be employed for this purpose. The water heating tank 18 has a thermostatically controlled electric heating element 22 therein that is adapted to heat and maintain the tank and its contents between the temperature limits of 160° F. and the boiling temperature of water, and preferably as near the higher temperature as possible. Water admitted to the tank 18 by the valve 19 displaces water and vapor from the tank through a pipe 23 forming a part of the discharge conduit 14. The pipe 23 preferably connects with the uppermost region of the tank 18 where the hottest water and vapor collect.

It can readily be appreciated that, with the tank 18 completely filled with water, opening the valve 19 admits cool water to the tank 18 and displaces heated water from the tank, through the conduit means 14, and out the nozzle 13; closing the valve 19 stops the displacement discharge of heated water from the tank. There is a tendency, however, for heated water to drip slowly from the nozzle 13 even though the valve 19 is closed. This dripping results from the expansion of the contents of the tank 18 as cool water admitted to the tank is heated by the electric heater 22. In accordance with this invention, annoying or hazardous dripping of hot water from the nozzle 13 is prevented by a novel overflow system utilizing an overflow tube or pipe 24. This overflow pipe 24 has its inlet end 26 disposed within the water discharge conduit 14 in communication with an elevated region of the conduit just ahead of the nozzle 13 in a position to receive water from the conduit 14 and conduct this water to the drain 16 to which the other end of the overflow pipe is connected.

The overflow pipe 24 functions to maintain the level of water standing in the discharge conduit 14 at or near the upper inlet end 26 of the pipe during idle periods of the dispenser. Each time valve 19 is closed to terminate dispensing, the U-shaped nozzle 13 is emptied of the water therein; the water that is down stream of the uppermost portion of the U flows into the user's cup, and the water in the upstream portion of the nozzle flows back through the overflow pipe 24 until the water level recedes to the level of the overflow pipe inlet 26. Water thereafter forced above the overflow inlet 26 by virtue of expansion of water in the heating tank 18, or leakage through the valve 19, flows into the overflow pipe 24 and into the drain 16, rather than out of the nozzle 13 where it might accidentally contact the hand of a person, or at least produce an annoying drip from the nozzle. A small quantity of water will flow through the overflow pipe 24 during normal discharge of hot water through the discharge conduit 14. The quantity of water thus lost is held to a minimum by making the overflow pipe 24 of comparatively small bore; for example, a tube of .08 inch internal diameter is sufficient to carry away expansion liquid from a discharge pipe of 9/32 inch internal diameter that is connected to a 2 quart heating tank.

The overflow pipe 24 is preferably connected into the dispensing system in such a manner as to be completely concealed from view. This is accomplished by passing the overflow pipe 24 through the bore of the discharge conduit 14 at least in that region of conduit 14 that is disposed exteriorly of the dispenser cabinet 11. A convenient plumbing fitting for the discharge conduit 14, and by means of which the overflow pipe 24 enters the discharge conduit, is illustrated at 27 in Fig. 1 of the drawings. The fitting 27 is a T-connector having a large bore in the top thereof for receiving the lower end of the discharge conduit 14. The overflow pipe 24 enters the fitting 27 through a smaller bore in the bottom of the fitting, which bore is coaxially arranged with respect to the discharge conduit bore to permit the overflow pipe 24 to extend directly into the discharge conduit 14. Water enters the fitting 27 through the pipe 23 that is connected to the water heating tank 18 and which extends into the fitting 27 at right angles to the overflow pipe 24. The fitting 27 is preferably brazed, soldered or otherwise connected in fluid tight fashion to the pipe 23, the discharge conduit 14 and the overflow pipe 24, and is supported in any convenient fashion, such as by attaching it to the underside of the catch basin 12 through which the discharge conduit 14 passes.

Fig. 2 illustrates an alternate treatment of the inlet end of the overflow pipe 24 that permits the overflow pipe 24 to be constructed of larger bore tubing. The flow of water through the modified tube is limited by swaging or necking down the inlet end of the tube as indicated at 28. This alternate arrangement has the advantage of reducing the likelihood of the overflow pipe 24 becoming plugged with foreign particles or blocked as the result of the adhesion of the water to the tube, which deficiencies exist when an extremely small bore tube is employed for overflow purposes. The small inlet area for the overflow tube 24 of Fig. 2, produced by the necked-down portion 28, limits the quantity of water that is lost through the overflow pipe during dispensing but, because of its short length, is less susceptible to becoming plugged or blocked.

From the foregoing it will be apparent this invention provides an improved hot water dispensing system wherein the objectionable dripping of hot water from the discharge nozzle is prevented. Moreover, it will be appreciated that the invention improves hot water dispensers of the type used to make beverages in that the overflow system is inconspicuously concealed within the dispensing conduit and permits a dispenser to be constructed with a cleaner and neater appearance than would be possible with external drip deflecting or preventing mechanisms.

While the apparatus is described herein as used to dispense hot water, it will be apparent that the apparatus may be used for dispensing other hot liquids as well.

While the invention has been shown in several forms, it will be obvious to those skilled in the art that it is not so limited, but is susceptible of various other changes and modifications without departing from the spirit thereof.

What is claimed is:

1. In apparatus for dispensing hot liquid, a cabinet, a liquid discharge conduit extending from the interior to the exterior of said cabinet and terminating in an open discharge end, a liquid heating tank in said cabinet, means connecting said discharge conduit to said tank, whereby said discharge conduit provides substantially unrestricted communication between the interior of said tank and the atmosphere, means for heating said tank and its contents, supply conduit means for connecting said tank to a source of pressurized liquid, a shut-off valve for controlling the flow of liquid into said tank, said valve when open permitting the displacement of heated liquid from said tank through said discharge conduit, and an overflow pipe having one end disposed within said discharge pipe, said overflow pipe entering said discharge conduit in a region of the conduit disposed interiorly of said cabinet and terminating in a region of the conduit disposed exteriorly of said cabinet.

2. In apparatus for dispensing hot liquid, a cabinet having a catch basin thereon, a drain for said basin, a liquid discharge conduit extending from the interior to the exterior of said cabinet and terminating in an open discharge end disposed above said basin, a liquid heating tank in said cabinet, means connecting said discharge conduit to said tank, whereby said discharge conduit provides substantially unrestricted communication between the interior of said tank and the atmosphere, means for heating said tank and its contents, supply conduit means for connecting said tank to a source of pressurized liquid, a shut-off valve for controlling the flow of liquid into said tank, said valve when open permitting the displacement of heated liquid from said tank through said discharge conduit, and an overflow pipe having one end disposed within said discharge pipe and its other end communicating with said drain, said overflow pipe entering said discharge conduit in a region of the conduit disposed interiorly of said cabinet and terminating in a region of the conduit disposed exteriorly of said cabinet.

References Cited in the file of this patent

UNITED STATES PATENTS

| | | |
|---|---|---|
| 1,742,901 | Davenport | Jan. 7, 1930 |
| 2,391,806 | Thompson | Dec. 25, 1945 |
| 2,408,403 | Babson et al. | Oct. 1, 1946 |
| 2,568,474 | Sciver | Sept. 18, 1951 |
| 2,682,976 | Melikian et al. | July 6, 1954 |
| 2,840,101 | Saylor | June 24, 1958 |